United States Patent [19]

Oshida et al.

[11] 4,125,859
[45] Nov. 14, 1978

[54] VIDEODISC PLAY-BACK APPARATUS WITH VARIABLE WIDTH BEAM

[75] Inventors: Yoshitada Oshida, Sayama; Susumu Sawano, Tachikawa, both of Japan

[73] Assignee: Hitachi, Ltd., Japan

[21] Appl. No.: 737,329

[22] Filed: Nov. 1, 1976

[30] Foreign Application Priority Data

Oct. 31, 1975 [JP] Japan ............................ 50-130464
Dec. 5, 1975 [JP] Japan ............................ 50-143993
Dec. 5, 1975 [JP] Japan ............................ 50-143994

[51] Int. Cl.² ............................................. G11B 7/12
[52] U.S. Cl. ........................... 358/128; 179/100.3 V; 179/100.41 L
[58] Field of Search ............... 358/128, 130, 132, 127; 179/100.3 V, 100.31, 100.3 R, 100.3 B, 100.3 N, 100.3 E, 100.3 GN, 100.4 C, 100.41 L; 346/76 L, 108; 250/570; 350/190

[56] References Cited

U.S. PATENT DOCUMENTS

| 1,917,003 | 7/1933 | Williams | 179/100.41 L |
| 3,829,622 | 8/1974 | Elliot | 179/100.3 V |
| 3,894,179 | 7/1975 | Jacobs | 179/100.3 V |
| 3,963,863 | 6/1976 | Malissin | 179/100.3 V |
| 3,971,002 | 7/1976 | Bricot | 179/100.3 V |
| 3,983,317 | 9/1976 | Glorioso | 358/129 |
| 4,011,400 | 3/1977 | Simons | 358/127 |

FOREIGN PATENT DOCUMENTS

| 2,429,850 | 1/1975 | Fed. Rep. of Germany | 179/100.3 V |
| 1,479,294 | 7/1977 | United Kingdom | 358/128 |

Primary Examiner—Bernard Konick
Assistant Examiner—Alan Faber
Attorney, Agent, or Firm—Craig & Antonelli

[57] ABSTRACT

Information play-back apparatus comprising a laser source, an information recorded medium, optical means for guiding a laser beam from the laser source to an information recorded track on the information recorded medium, and means for varying the size of the spot of the laser beam on the information recorded track in dependence on the position of the track on the information recorded medium.

24 Claims, 20 Drawing Figures

FIG. 4
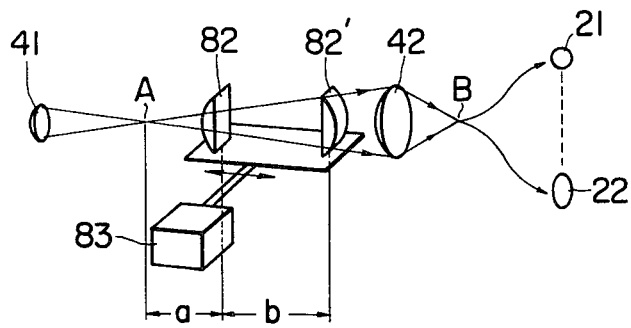
FIG. 5
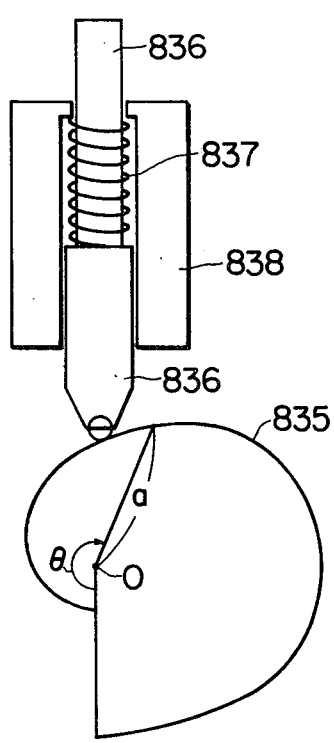
FIG. 6(a)
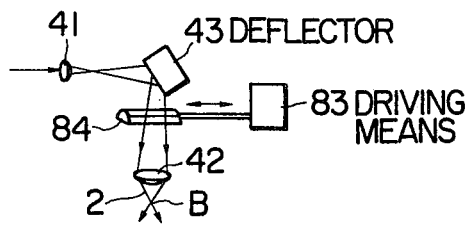
FIG. 6(b)
FIG. 6(c)    FIG. 6(d)
    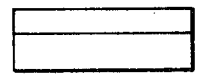

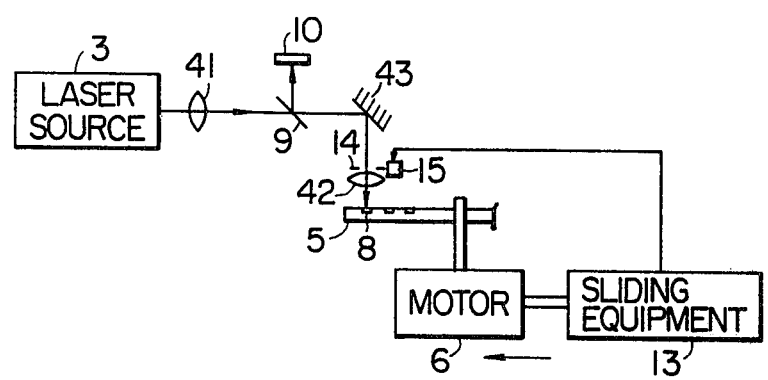
FIG. 10
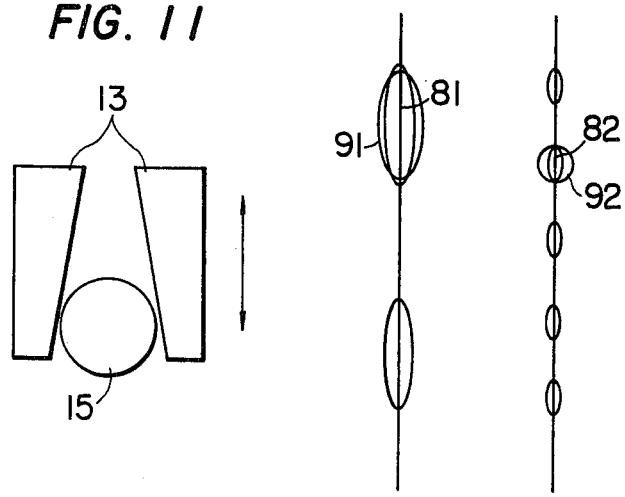
FIG. 11
FIG. 12

VIDEODISC PLAY-BACK APPARATUS WITH VARIABLE WIDTH BEAM

BACKGROUND OF THE INVENTION

1. Field of the Invention

This invention relates to apparatus for the play-back of information from an optical video disk, and more particularly to information play-back apparatus in which the size of the spot produced by the light beam illuminating the optical video disk is varied according to the pattern of an information recorded portion.

2. Description of the Prior Art

As is well known, there have been developed a technique wherein optical recording is made at a size of about 1 micron on a disk plate or disk sheet, video signals or digital information being recorded under the condition under which the phases or amplitudes in such recorded portions (called "pits") are made different from those in other portions of what is called the video disk and wherein the signals or information are played back from the video disk.

In this case, since the inner track on the disk which is closer to the center of the disk and the outer track closer to the fringe or outer rim of the disk have different lengths, the form or slope of the pits to be recorded on the respective tracks are made different. That is, the pits on the outer side are more elongate along the track than the pits on the inner side so that the same number of pits can be provided on each track. This is based on the fact that the speed of revolution of the disk is constant and so, the number of pits per revolution should be constant.

Heretofore, the read-out of the signals has been carried out by illuminating the pits of the different shapes by a converging light beam having a constant spot size at all times. Accordingly, the signals obtained from the tracks on the outer side and on the inner side would naturally differ.

More specifically, in prior art play-back apparatus for reproducing information stored on an optical video disk, in playing back video and audio signals recorded within a region of 5 cm-15 cm in radius on the disk having a diameter of about 30 cm, the spot size on the disk of a He-Ne laser beam employed in the play-back apparatus has always been maintained constant. It is therefore impossible with such apparatus to obtain from tracks on both the outer periphery and the inner periphery of the disk good signals, i.e., signals having little deformation and high S/N (signal-to-noise) ratio. Usually, the spot size is set so as to be suitable for the tracks on the outer periphery side of the disk. At the inner periphery, accordingly, the S/N ratio lowers and the deformation of the signal waves increases, so that moire or beat effects appear in a played-back image. This is attributed to the fact that the lengths of the information pits differ by a factor of three between the outer and inner peripheries of the disk, and that 2-3 information pits are simultaneously illuminated at the inner periphery when an optimum spot size for the outer periphery is used. On the other hand, when the spot size is made most suitable for the tracks at the inner periphery, the spot size is too small to completely illuminate the pits in the track at the outer periphery. Accordingly, the modulation depth of the signals lowers sharply, and the S/N ratio at the outer periphery becomes low.

This will be more specifically explained with reference to FIGS. 1(a)-1(c).

FIG. 1(a) shows the situation in which the same play-back light beam 2 is projected onto pits 11 on an inner track 1a and pits 12 on an outer track 1b. FIG. 1(b) indicates that, when the intensity distribution of the illumination beam is selected to achieve on the inner track 1a a play-back signal of high S/N ratio and high output power, noises (higher harmonics) arise in the signal derived from the outer track 1b, as depicted by a curve 1b''. Further, FIG. 1(c) indicates that, when an illumination beam intensity distribution appropriate for the outer track 1b is used, the output becomes low on the inner track 1a as depicted by a curve 1a''. That is, in either case, a good play-back signal is not obtained. In FIGS. 1(b) and 1(c), curves 1a' and 1b' represent the play-back outputs of the inner track 1a and the outer track 1b, respectively, in the case where the intensity distributions of the illumination beam are selected to be optimum for each track.

SUMMARY OF THE INVENTION

An object of this invention is to provide an information play-back apparatus with which a play-back output of high S/N ratio is obtained for pits on both the outer and inner tracks.

In order to accomplish such an object, this invention equips information play-back apparatus with beam pattern control means for varying the pattern of the illumination beam between the time when the beam illuminates pits and an outer track and the time when it illuminates pits on an inner track of the disk.

More specifically, a comparatively small illumination beam is employed so that a high signal output may be attained on the inner track, as indicated in FIG. 1(b). In this case, however, if such a beam is used to illuminate the outer track, the harmonic components higher than the first order as contained in the output becomes large on the outer track. This is because, on the outer side, the distribution of the converging illumination beam in the direction of the track i.e., in the circumferential direction, is narrow as compared with the length of the pit in this direction. On the outer track, therefore, the higher harmonic components are extinguished by expanding the distribution of illumination in the direction in accordance with this invention.

Alternatively, a comparatively large illumination beam is employed so that a large signal may be attained on the outer track as indicated in FIG. 1(c). In this case, however, the beam is too wide in the circumferential direction of the track on the inner track. On the inner side, therefore, the distribution of the beam in the circumferential direction of the track is narrowed in accordance with this invention.

BRIEF DESCRIPTION OF THE DRAWINGS

FIG. 4 is a schematic view showing the construction of another embodiment of this invention;

FIG. 5 is view showing the construction of an embodiment of driving means shown in FIG. 4;

FIG. 6(a) is a schematic view showing the construction of still another embodiment of this invention;

FIG. 6(b), 6(c) and 6(d) are a plan view, a front view, and a side view showing the configuration of a lens for use in the embodiment shown in FIG. 6(a), respectively;

FIG. 10 is a block diagram showing a further embodiment of this invention;

FIG. 11 is a view for explaining a slit and a beam spot for use in the embodiment shown in FIG. 10; and FIG. 12 is a view showing the construction of the embodiment shown in FIG. 10.

DESCRIPTION OF THE PREFERRED EMBODIMENTS

Figure 2A:
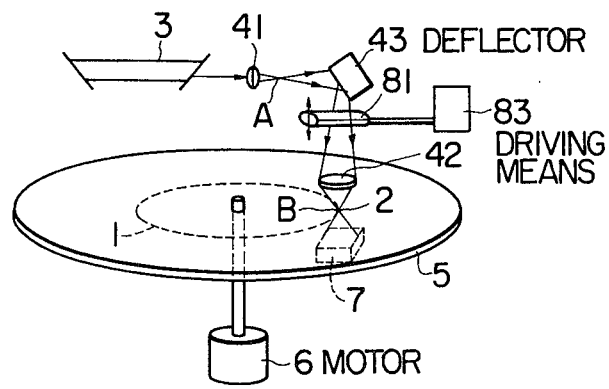
FIG. 2(a) is a schematic view showing the construction of an embodiment of this invention.

FIG. 2(a) is a view which shows the construction of an embodiment of this invention. In the figure, numeral 3 designates a laser source, numerals 41 and 42 designate lenses, numeral 43 designates a deflector, numeral 5 designates a disk, and numeral 6 identifies means for driving the disk (for example, a motor). The lenses 41 and 42 and the deflector 43 are usually constructed into a unit within a single casing forming an optical head.

A beam emergent from the laser source 3 is converged and projected onto pits arrayed on a track 1 on the disk 5 by the beam converging means consisting of the lenses 41 and 42 and the deflector 43. Subsequently, a diffracted beam reflected from or transmitted through the pit is read out by opto-electronic transfer means 7, such as an optical sensor.

In FIG. 2(a), the beam transmitted through the disk 5 is read out as the disk 5 is rotated by the driving motor 6. In synchronism with the rotation, the optical head moves along the track of the disk 5 (means for moving the optical head will be described later), and information is sequentially read out from the pits on the disk 5 by the opto-electronic transfer means 7. The deflector 43 functions so that, when the beam has deviated from the track, it deflects the beam by the amount of deviation necessary to return the beam to the original position. A typical servo system of conventional type is controlled by a signal from the optical sensor 7 to continuously adjust the diflector 43. Since this portion is not directly relevant to the present invention, the detailed description is omitted.

The construction and operation of the information playback apparatus as described above are known. In such construction this invention disposes means for varying the pattern of the beam in the optical path along which the beam from the laser source is converged onto the disk 5.

In FIG. 2(a), the beam control means consists of a cylindrical lens 81 and means 83 for driving the cylindrical lens. The cylindrical lens 81 is interposed between the deflector 43 and the lens 42 in the illustrated example. The driving means 83 moves the cylindrical lens 81 in the direction of the beam (direction indicated by arrows in the figure). As a result, the beam has its pattern varied in a direction perpendicular to the optical axis of the cylindrical lens 81 and parallel to the plane of the disk 5.

Figure 2B:
FIGS. 2(b) and 2(c) are a side view and a front view of a cylindrical lens for use in the embodiment shown in FIG. 2(a), respectively.
Figure 2C:

FIGS. 2(b) and 2(c) are a side view and a front view, respectively, of an example of the cylindrical lens 81 employed in the embodiment of FIG. 2(a).

Figure 2D:
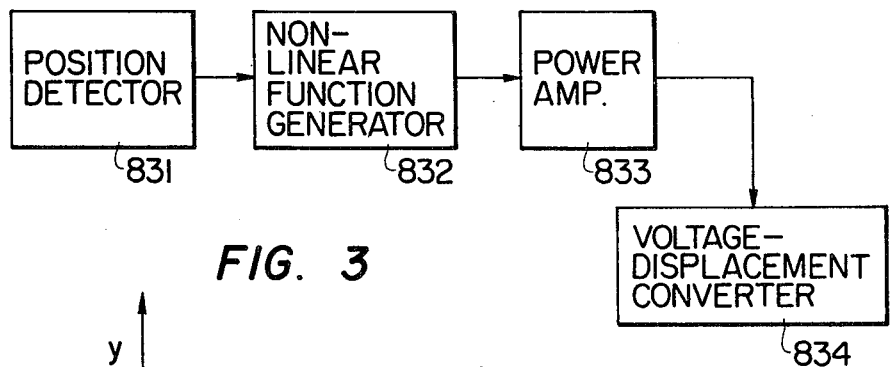
FIG. 2(d) is a block diagram of an embodiment of driving means for use in the embodiment shown in FIG. 2(a)

FIG. 2(d) is a block diagram showing the construction of an embodiment of the driving means 83. In the figure, numeral 831 designates a position detector, numeral 832 identifies a non-linear function generator, numeral 833 denotes a power amplifier, and numeral 834 designates a voltage-displacement converter. The position detector 831 is constructed of, for example, a differential transformer and detects the position of the track as a voltage value. In case where the tracks are, for example, in a spiral configuration on the disk 5, the optical head must have its position varied along the tracks. In other words, the spacing between the center of rotation of the disk 5 and the position at which the beam illuminates the disk 5 (the position is indicated at B in FIG. 2(a)) must be varied with the rotation of the disk 5. To this end, in providing for controlled movement of the optical head, the rotation of the disk 5 is converted into a pulse signal by a known rotary encoder, a pulse motor is driven by the pulse signal and the rotation of the pulse motor is converted into a rectilinear motion by a worm gear to drive the optical head. Of course, instead of moving the optical head, it is also possible to fix the optical head and to move the disk 5 by means of the worm gear. Since the optical head is thus relatively moved along the track, the position of the track is detected in the form of a voltage value by causing the worm gear to also drive the movable coil of a differential transformer which then provides the necessary signal voltage indicating the position of the track.

Figure 3:
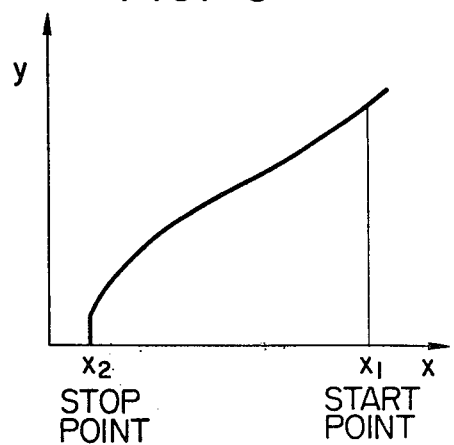
FIG. 3 is a diagram for explaining the operation of the embodiment shown in FIG. 2(d)

In the case where the light beam from the optical head moves along spiral tracks on the disk 5 from the outermost periphery towards the inner side (towards the center of rotation of the disk), it is possible to previously determine the positions of the cylindrical lens 81 in correspondence with the track positions. The relationship between the track positions and the positions of the cylindrical lens 81 is represented as shown in FIG. 3. In the figure, the positions (denoted by $x$) of the tracks are taken on the abscissa, and the positions (denoted by $y$) of the cylindrical lens are plotted on the ordinate. The point indicates the position of the track which is situated at the outermost periphery of the disk 5, that is, the position at which the optical head starts, and the point $x_2$ indicates the position of the track which is situated at the innermost periphery of the disk 5, that is, the position at which the optical head stops.

Accordingly, when a function generator which has an input-output characteristic as illustrated in FIG. 3 is employed as the nonlinear function generator 832, the position of the track obtained as a voltage value from position detector 831 drives the generator 832 which produces an output voltage representing the position of the cylindrical lens. That is, the non-linear function generator 832 realizes in the polygonal line approximation the input-output characteristic which is obtained by receiving voltage inputs given on the abscissa in FIG. 3 and delivers voltage outputs given on the ordinate. Therefore, the position of the cylindrical lens is obtained as a voltage output from generator 832 by giving the voltage value indicative of the position of the track as the input thereto.

The output voltage of generator 832 is amplified by the power amplifier 833, the output of which is delivered as an input to the voltage-displacement transducer 834. The voltage-displacement transducer 834 is constructed of a known automatic balancing potentiometer which is made up of a slide resistance and a servomotor. The cylindrical lens is provided at a moving part of the potentiometer. Accordingly, when the output of the amplifier 833 is applied to the converter 834, the cylindrical lens 81 moves to a predetermined position. In this manner, the cylindrical lens 81 moves according to the position of the track which is illuminated by the light beam emitted from the optical head, and the pattern of the beam which corresponds to the position of the track is obtained.

FIG. 4 is a view showing the construction of another embodiment of this invention. It illustrates only the parts of the beam pattern varying means and the optical head, and the remaining construction is the same as in FIG. 2(a).

In this embodiment, the beam pattern controlling means comprises two cylindrical lenses 82 and 82' in combination. The cylindrical lenses 82 and 82' are so arranged that a beam from a point of convergence A is again formed as a virtual image in the vicinity of the point A. The cylindrical lenses 82 and 82' are integrally moved in the direction of the beam by driving means 83.

Letting a denote the spacing between the point of convergence A and the lens 82 and $a'$ denote the spacing between the image of the point A owing to the lens 82 and the lens 82', the following equations (1) and (2) hold in order that the image may be again formed as the virtual image at the point A as in the present embodiment:

$$\frac{1}{a} + \frac{1}{a'} = \frac{1}{f_1} \quad (1)$$

$$\frac{1}{b-a'} - \frac{1}{a+b} = \frac{1}{f_2} \quad (2)$$

where $f_1$ and $f_2$ denote the focal lengths of the respective cylindrical lenses 82 and 82'.

Since, in the present embodiment, the lenses 82 and 82' are integrally moved, b is constant and a is varied according to the position of the track from the center. A lens 42 has the function of imaging the point A at the point B. Therefore, only the magnification in one direction (a direction perpendicular to the axis of the cylindrical lenses and perpendicular to the beam, i.e., the vertical direction as viewed in the figure) of the virtual image of the point A formed at the point A by the cylindrical lenses 82 and 82' is varied, for example, from 1 to 2 by varying a. Consequently, the pattern of the converging illumination beam at the point B changes from that shown at 21 to that shown at 22. The value of a in this case is evaluated as in the following equation:

$$a = \frac{-f_1(mf_2 + b + f_2)}{f_1 - mf_2} \quad (3)$$

where $m$ denotes the magnification, which changes from 1 to 2 in the above example.

In the case of the embodiment of FIG. 4, the position of the convergence of the beam by the beam converging means and the position of the convergence of the beam realized by the use of the beam pattern controlling means are substantially identical, and only the beam pattern at the position of the convergence is varied.

Although the foregoing embodiment employs two convex cylindrical lenses, concave cylindrical lenses may be adopted. The number of lenses may well be greater than two. It is also permitted to combine a moving lens and a fixed lens. The beam pattern varying means can also be realized with a hologram, a phase plate or the like having the function of the lenses.

Desirably, the driving means 83 moves the lenses 82 and 82' in correspondence with the magnification $m$ which is substantially proportional to the read-out position (the point B indicated in FIG. 2(a)) on the disk 5, i.e., the distance r from the center of the disk, that is, in correspondence with the value of a which is given by Eq. (3). However, even when the lenses 82 and 82' are approximately moved in proportion to $m$, the effect of this invention is fully demonstrated.

In order to move the lenses 82 and 82' in correspondence with a determined by Eq. (3), cam means which realizes a motion corresponding to the function a may be employed, or the speed of the motor of the driving means may be electrically controlled in correspondence with the function a.

In such electrical control system, a torque motor is employed as the voltage-displacement converter 834 constituting the driving means shown in FIG. 2(d), the speed of the torque motor is varied in proportion to the function a, and the lenses 82 and 82' are moved by the torque motor. On the other hand, the cam means which realizes the motion indicated by the function a may be constructed as shown in FIG. 5. Referring to the figure, numeral 835 designates a cam. A gear wheel (not shown) is provided at the axis of rotation 0 of the cam 835, and the output of the torque motor is transmitted thereto. Shown at 836 is a piston, one end of which is in contact with the cam 835 so that the motion of the cam 835 is transmitted to the piston 836. A spring 837 is retained on the piston 836, and it normally urges the piston 836 towards the cam 835 so as to be held in contact therewith. The lenses 82 and 82' are attached to the other end of the piston 836 so as to move integrally, and they move following the motion of the cam 835. Numeral 838 indicates a guide for the piston 836 and the spring 837.

The cam 835 has a configuration corresponding to a predetermined relationship. Since the output of the torque motor is transmitted to the axis of rotation 0 of the cam 835, the following equation (4) holds:

$$x = a\theta + \beta \quad (4)$$

where
- $x$: the position of the track,
- $\theta$: the angle of rotation of the cam,
- $\beta$: a constant, and
- $\beta$: a constant.

On the other hand, when the optimum magnification $m$ corresponding to the track position is evaluated, the following function is obtained:

$$m = m(x) \quad (5)$$

From equations (3), (4) and (5), accordingly, the following equation (6) is obtained:

$$a = \frac{-f_1\{m(\alpha\theta + \beta)f_2 + b + of_2\}}{f_1 - m(\alpha\theta + \beta)f_2} \quad (6)$$

Therefore, a cam having a surface which satisfies the relation of $\theta$ and $a$ represented by Eq. (6) may be used.

Figure 1A:
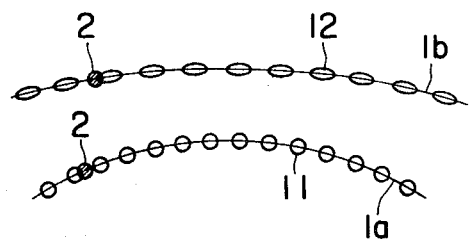
FIG. 1(a) is an explanatory view showing the relationship between pits and a beam spot in a typical prior art apparatus.
Figure 1B:
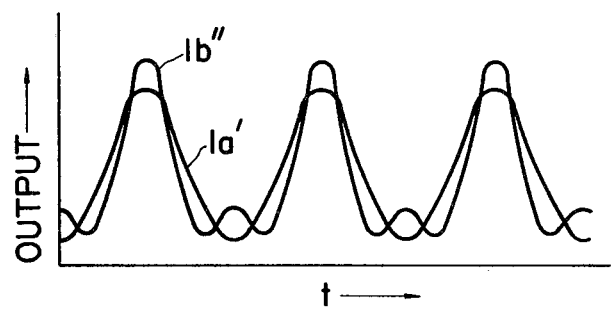
FIGS. 1(b) and 1(c) are diagrams each showing the relationship between the pattern of the beam spot and the output from the pits.
Figure 1C:
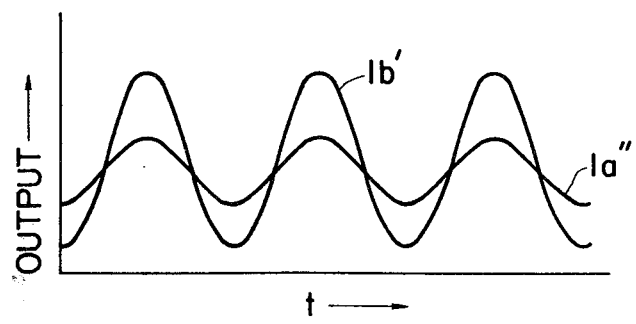

In the embodiment of FIG. 4, $m$ is increased from 1 to 2 as the read-out position proceeds from the track at the inner side towards the track at the outer side of the disk. In the case where the larger output signal is obtained on the outer side in the prior art method as in FIG. 1(c), the driving means may be operated so that conversely the magnification $m$ may become from ½ to 1 as the read-out position proceeds from the inner side towards the outer side. Although, in the above disclosure, description has been made of the example in which the magnification is varied from 1 to 2 or from ½ to 1, it is to be understood that the variation of the magnification is determined by the patterns of the pits and the optical system, and that it is not restricted to the specific range of such values as stated herein.

FIG. 6(a) is a diagram showing the construction of another embodiment of this invention. It illustrates only the parts of the beam pattern varying means and the optical head, and the remaining construction is the same as in FIG. 2(a). Referring to FIG. 6(a), numeral 83 designates the driving means, which is constructed, for example, as shown in FIG. 2(d). Numeral 84 designates a lens for varying the beam pattern. The lens 84 has a configuration as illustrated in FIG. 6(b), 6(c) and 6(d), which are plan, front, and side views thereof, respectively. That is, the lens 84 has an external shape cut parallel to the angle of a cone or represents a segment of a cone. The focal position of the lens is shifted by moving it in the direction of the arrows in FIG. 6(a) by the driving means 83.

Figure 7:
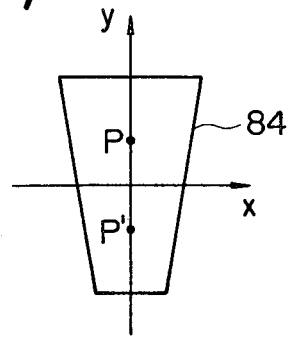
FIG. 7 is a diagram for explaining the operation of a lens for use in the embodiment shown in FIG. 6(a)

The shift of the focal position of the lens 84 will now be explained with reference to FIG. 7. The figure is a plan view of the lens 84 equivalent to FIG. 6(b), and the x-axis and y-axis of the lens are determined as shown. Since the curvature of the plane of incidence in the y-axial direction is zero (flat), light incident on the plane of paper at point P and point P' undergoes neither convergence nor divergence of the beam just as it passes through plane glass. In the x-axial direction, however, the point P' has a greater curvature than the point P. Therefore, light passing through the point p' is subject to a greater change in the x-axial direction and has a point of convergence closer to the lens 84 than that for the point P. Since the lens 84 has a shape with the angles of the cone cut in parallel, light incident normally to the plane of paper in FIG. 7 advances also normally to the plane of paper after permeating through the lens, and hence, the advancing direction of the light is not curved by the lens.

By employing such a lens and moving it in the direction of the arrows in FIG. 6(a) by way of the driving means 83, the pattern of the beam of light emitted from the optical head can be varied. As a result, as in the embodiment shown in FIG. 2(a), the illumination beam at point B (the point at which the beam emitted from the optical head illuminates the disk 5) in FIG. 6(a) can be made to correspond to a desired pattern.

Further, although the driving means 83 is provided in the embodiment of FIG. 6(a), it is needless to say that the provision of the driving means 83 is unnecessary if the lens 84 has enough length (equal to the radius of the information recorded medium) to cover all the tracks on the disk.

Figure 8:
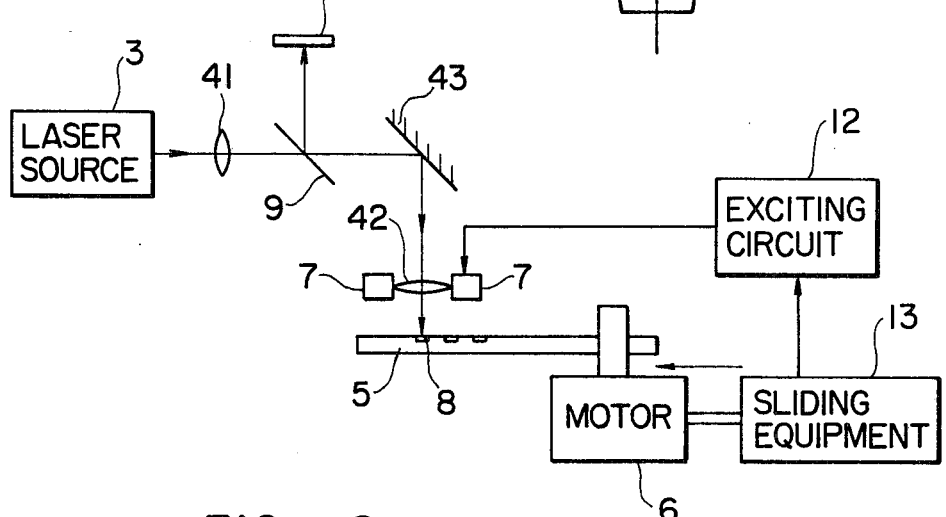
FIG. 8 is a block diagram showing yet another embodiment of this invention.

FIG. 8 is a view showing the construction of another embodiment of this invention. In this embodiment, a voice coil and a driving circuit therefor are employed as the means for varying the pattern of the light beam to be projected on the disk 5, and the focal position of a lens for controlling the beam is varied by the voice coil. In the figure, the same symbols as in FIG. 2(a) indicate the same or equivalent parts. Numeral 7 designates a voice coil, which moves a lens 42 slightly. Numeral 12 represents an exciting circuit for exciting the voice coil 7. Shown at 13 is a sliding equipment which moves the disk 5 instead of moving the optical head, as in the foregoing embodiments. Numeral 8 denotes a pit recorded on the disk 5, numeral 9 a beam splitter, and numeral 10 photoelectric conversion means, such as optical sensor.

Description will be made of the detection of information from the pit 8 in such a construction. The laser beam emergent from the laser source 3 is focused onto the pit 8 on the disk 5 via the lens 41, the deflector 43 and the lens 42. The beam reflected from the disk 5 is guided by the beam splitter 9 to the optical sensor 10, which detects a signal. That is, the embodiment shown in FIG. 8 adopts an optical system for the signal detection by a reflection type method. It will now be explained how to vary the pattern of the laser beam. The disk 5 is rotated by the driving means 6, and is also moved in the direction of the arrow in FIG. 8 by the sliding equipment 13. The sliding equipment 13 is composed of the rotary encoder, pulse motor and worm gear, as described above. It moves the disk 5 in such a manner that the rotation of the disk 5 is converted into a pulse signal by the rotary encoder, that the pulse motor is driven by the pulse signal and that the rotation of the pulse motor is turned into a rectilinear motion by the worm gear.

The voice coil driving or exciting circuit 12 is composed of, for example, a differential transformer and an amplifier (current amplifier). A movable coil of the differential transformer is moved by the movement of the worm gear in the sliding equipment 13, so that the movement of the worm gear is obtained as a voltage value. Using the voltage, the bias of the amplifier is controlled to vary the output thereof. Accordingly, the output of the amplifier varies with the movement of the disk 5. The voice coil 7 is excited by the output, to move the lens 42 slightly and to vary the focal position of the lens 42.

It is a matter of course that the differential transformer arrangement is not restrictive, but that any means capable of converting the movement of the disk 5 into a voltage or current is applicable to the present invention. The pattern of the laser beam is controlled as illustrated in FIG. 9 by the voice coil 7 and the lens 42.

Figure 9:
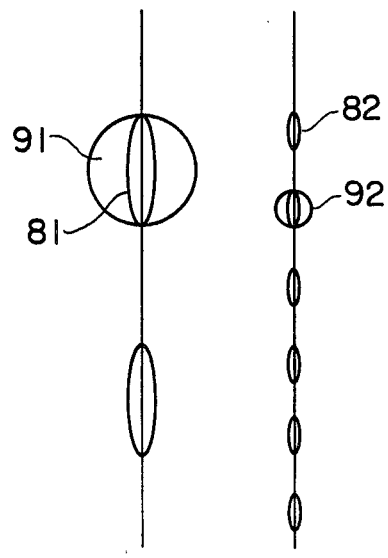
FIG. 9 is a view for explaining the operation of the embodiment shown in FIG. 8.

As shown in FIG. 9, the beam spot is made large as indicated at 91 for a pit 81 as regards the track at the outer periphery of the disk, and it is made small as indicated at 92 for a pit 82 as regards the track at the inner periphery. In this case, the beam is focused to the utmost for the innermost track of the disk in advance, and it is defocused gradually to increase the spot diameter as the read-out position comes closer to the outer periphery. Since the variation of the spot diameter becomes linear to the radius of the disk, the value of the current to flow through the voice coil 7 may be varied substantially linearly. Merely the magnitude of the current may be varied without especially employing a servo circuit.

The optimum value of the spot diameter is such that the area of the beam spot 91 becomes approximately twice as large as the area of the pit 81 in FIG. 9 and that the area of the beam spot 92 becomes approximately twice as large as the area of the pit 82. The spot diameter is varied substantially linearly according to the radius of the disk 5 so as to establish such areas of the beam spot.

Although, in the embodiment of FIG. 8, the signal detection by the reflection type method has been referred to, it is needless to say that the same principle is applicable also to the transmission type of system.

By employing the information play-back apparatus of this invention as explained above, uniform good signals can be detected over the entire area of the disk having a diameter of 30 cm.

FIG. 10 is a view showing the construction of another embodiment of this invention. It differs from the embodiment shown in FIG. 8 in that the means for varying the pattern of the light beam is constructed of a moving slit and a driver for the moving slit. The remaining construction is the same as in the embodiment of FIG. 8. Referring to FIG. 10, numeral 14 designates a moving slit, and numeral 15 a driver therefor. Numeral 42 indicates a lens, which of course is not moved in this case.

In FIG. 10, the movable slit-driver 15 is made up of gear wheels which transmit the motion of the worm gear constituting the sliding equipment 13 to an adjusting knob for the movable slit 14. The plurality of gear wheels are employed in order to control the extent of movement of the slit 14. The gear ratio of the gear wheels is selected so that the width of the moving slit 14 may become larger as the disk 5 moves in the direction of the arrow.

An example of such moving slit 14 is shown in FIG. 11. The moving slit 14 is moved in the direction of arrows relatively to the laser beam. The laser beam is made the finest by the slit at the outer periphery of the disk 5, and most of the laser beam is allowed to pass at the inner periphery. In this case, the ratio between the maximum width and the minimum width of the moving slit is 3:1.

The effect of the moving slit 14 on the spot size on the disk 5 is illustrated in FIG. 12. At the outermost periphery, the spot is wide in the direction of the track for an information pit 81 as indicated at 91. Thus, light is sufficiently diffracted from the elongate pit at the outermost periphery, and a played-back signal of high modulation degree can be obtained. At the innermost periphery, the spot is narrow in the direction of the track for a pit 82 as indicated at 92. Thus, while keeping a resolving power at the respective pits, a high modulation degree can be attained.

Although the signal detecting optical system of the reflection type has been referred to in the explanation of FIG. 10, it is needless to say that the same applies to the transmission type. Further, the position of the moving slit is not restricted to that shown in FIG. 10, but it may be disposed any place within the optical path. Moreover, the motion of the moving slit may be a rectilinear one corresponding to the radius of the disk.

The lens 42 is used at the diffraction limitation. Therefore, as the laser beam is made finer by the slit 14, the actual effective diameter of the lens 42 (the diameter of the beam incident on the lens 42) becomes smaller, and the size of the spot focused on the disk 5 becomes larger. Accordingly, the spot 91 on the disk 5 at the time when the laser beam is reduced most by the slit 14 becomes the largest, and it has a spot pattern adapted for the largest pit 81 at the outermost periphery. In contrast, when the laser beam is not reduced by the slit 14, the actual effective diameter of the lens 42 becomes the largest, and the spot 92 has a spot pattern adapted for the smallest pit 82 at the innermost periphery.

Regarding the form of the slit, a variety of modifications may be considered besides the slit shown in FIG. 11. For example, an iris which is used in cameras, etc. is possible. Needless to say, the opening of the iris becomes the largest when the laser beam is projected on the pit at the innermost periphery of the disk, and the smallest when the laser beam is projected on the pit at the outermost periphery.

Using the embodiment shown in FIG. 10, good play-back video signals free from any waveform distortion and having a constant modulation degree can be obtained over the entire area of the disk.

As explained above, this invention has solved the problem of the lowering of the S/N (signal-to-noise) ratio ascribable to the difference of the shapes of recorded pits between the track at the inner side and that at the outer side of a disk, by varying the pattern of an illumination beam by beam pattern controlling means, and has made information play-back of high S/N ratio possible for all the tracks of the disk. The invention is greatly effective when applied to optical information read-out apparatus.

Further, a method for recording information has been known in which the width of pits in a direction perpendicular to the circumferential direction of a disk (the pit widths) are varied according to the positions of tracks relative to the center of the disk, the pit width being made larger at a portion closer to the center of the disk. In case of recording information with this method, the spacing between the tracks need be made wide according to the rate of increase of the maximum pit width. For this reason, the recording density of information lowers.

In contrast, the disk which is used for the information play-back apparatus of this invention can hold the track spacing narrow. It is therefore possible to record information at high density on the disk and to play back the high density information.

What is claimed is:

1. In an information play-back apparatus having at least a light source producing a light beam, a disc-shaped information recorded medium, and optical means for guiding said light beam along a path from said light source to an information recorded track on said information recorded medium, the improvement comprising means disposed in the optical path of said light beam to said information recorded track for controlling the pattern of said light beam impinging on said information recorded track on said information recorded medium in accordance with the position of said information recorded track on said information recorded medium.

2. The information play-back apparatus according to claim 1, characterized in that said means for controlling the pattern of said light beam impinging on said information recorded medium controls the pattern in accordance with the radial position of said impinging light beam on said information recorded medium.

3. The information play-back apparatus according to claim 2, characterized in that the means for controlling the pattern of said light beam controls at least one of the size and shape of the light beam impinging on said information recorded medium.

4. The information play-back apparatus according to claim 2, characterized in that the means for controlling the pattern of said light beam controls the pattern of said light beam to be larger at an outer periphery of said information recorded medium and smaller at an inner periphery thereof.

5. The information play-back apparatus according to claim 1, characterized in that said means for controlling the pattern of said light beam enables reproduction of said information recorded on said information recorded medium with high signal-to-noise ratio independently of the positioning of the recorded information on said information recorded medium.

6. In an information play-back apparatus having at least a light source producing a light beam, a disk-shaped information recorded medium, and optical means for guiding said light beam along an optical path from said light source to an information recorded track on said information recorded medium, the improvement comprising means disposed in the optical path of said light beam to said information recorded track for controlling the pattern of said light beam to be larger at an outer periphery of said information recorded medium and smaller at an inner periphery thereof.

7. The information play-back apparatus according to claim 6, characterized in that the beam pattern controlling means comprises a cylindrical lens, and moving means for moving said cylindrical lens in the direction of said light beam along said optical path.

8. The information play-back apparatus according to claim 7, further including drive means for rotating said recorded medium and means for effecting relative movement of said beam and said recorded medium in synchronism with said drive means for tracking said beam over the surface of said recorded medium.

9. The information play-back apparatus according to claim 8, wherein said moving means comprises position detecting means for detecting the relative radial position of said beam on the surface of said recorded medium, function generator means responsive to said position detecting means for generating a control signal whose magnitude is a function of the detected position of said beam, and displacement means for displacing said lens in response to said control signal.

10. The information play-back apparatus according to claim 6, characterized in that the beam pattern controlling means comprises at least two cylindrical lenses imaging a point of convergence, to which said light beam from said light source is converged by said optical means, on said recorded medium with a magnification of the image which is varied in one direction, and moving means for moving at least one of said cylindrical lenses in the direction in which said light beam advances.

11. The information play-back apparatus according to claim 10, including means for supporting said two cylindrical lenses for conjoint movement, and so said moving means is effective to move both lenses simultaneously in the direction in which said light beam advances.

12. The information play-back apparatus according to claim 11, wherein said supporting means includes a rotatable cam having a cam surface, and a piston biased into contact with said cam surface and carrying said two cylindrical lenses.

13. The information play-back apparatus according to claim 6, characterized in that the beam pattern controlling means comprises a lens disposed in parallel to a radial line of said recording medium and having an external shape which is a segment of a cone.

14. The information play-back apparatus according to claim 6, characterized in that the beam pattern controlling means comprises a lens having an external shape which is a segment of a cone, and moving means for moving said lens perpendicularly to a direction in which said light beam advances.

15. The information play-back apparatus according to claim 14, further including drive means for rotating said recorded medium and means for effecting relative movement of said beam and said recorded medium in synchronism with said drive means for tracking said beam over the surface of said recorded medium.

16. The information play-back apparatus according to claim 15, wherein said moving means comprises position detecting means for detecting the relative radial position of said beam on the surface of said recorded medium, function generator means responsive to said position detecting means for generating a control signal whose magnitude is a function of the detected position of said beam, and displacement means for displacing means for displacing said lens in response to said control signal.

17. The information play-back apparatus according to claim 6, characterized in that the beam pattern controlling means comprises a voice coil, and voice coil being movingly connected to a lens which constitutes part of said optical means, and excitation means for exciting said voice coil to effect movement of said lens, said excitation means providing a varying output applied to said voice coil to effect variation in the pattern of said beam.

18. The information play-back apparatus according to claim 17, further including drive means for rotating said recorded medium and means for effecting relative movement of said beam and said recorded medium in synchronism with said drive means for tracking said beam over the surface of said recorded medium.

19. The information play-back apparatus according to claim 18, wherein said means for effecting relative movement comprises means for moving said recorded medium with respect to a fixed light beam path.

20. The information play-back apparatus according to claim 19, wherein said moving means comprises position detecting means for detecting the relative radial position of said beam on the surface of said recorded medium, function generator means responsive to said position detecting means for generating a control signal whose magnitude is a function of the detected position of said beam, and displacement means for displacing said lens in response to said control signal.

21. The information play-back apparatus according to claim 6, characterized in that the beam pattern controlling means comprises movable slit means having a slit disposed on said optical means providing a varying aperture, said light beam passing through said slit of said movable slit means, and driving means for varying the slit aperture of said movable slit means, said driving means making the slit width smaller as said information recorded medium is directed to the outer periphery thereof.

22. The information play-back apparatus according to claim 21, further including drive means for rotating said recorded medium and means for effecting relative movement of said beam and said recorded medium in synchornism with said drive means for tracking said beam over the surface of said recorded medium.

23. The information play-back apparatus according to claim 22, wherein said means for effecting relative movement comprises means for moving said recorded medium with respect to a fixed light beam path.

24. The information play-back apparatus according to claim 7, wherein the beam pattern controlling means controls the pattern of said light beam impinging on said information recorded track on said information recorded medium in accordance with the position of said information recorded track on said information recorded medium.

* * * * *